(12) United States Patent
Liu et al.

(10) Patent No.: US 11,985,710 B2
(45) Date of Patent: May 14, 2024

(54) CONFIGURATIONS FOR SMALL DATA TRANSMISSION

(71) Applicant: QUALCOMM Incorporated, San Diego, CA (US)

(72) Inventors: Huichun Liu, Beijing (CN); Ozcan Ozturk, San Diego, CA (US); Gavin Bernard Horn, La Jolla, CA (US); Peng Cheng, Beijing (CN); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/276,794

(22) PCT Filed: Sep. 6, 2019

(86) PCT No.: PCT/CN2019/104646
§ 371 (c)(1),
(2) Date: Mar. 16, 2021

(87) PCT Pub. No.: WO2020/088097
PCT Pub. Date: May 7, 2020

(65) Prior Publication Data
US 2021/0337602 A1 Oct. 28, 2021

(30) Foreign Application Priority Data
Oct. 30, 2018 (WO) ................ PCT/CN2018/112704

(51) Int. Cl.
*H04W 76/30* (2018.01)
*H04W 28/26* (2009.01)
(Continued)

(52) U.S. Cl.
CPC ....... *H04W 74/0841* (2013.01); *H04W 28/26* (2013.01); *H04W 74/008* (2013.01); *H04W 76/30* (2018.02)

(58) Field of Classification Search
CPC ............. H04W 74/0833; H04W 76/27; H04W 74/0841; H04W 74/006; H04W 76/30; H04W 74/008; H04W 28/26
See application file for complete search history.

(56) References Cited

U.S. PATENT DOCUMENTS

| | | |
|---|---|---|
| 2010/0151852 A1 | 6/2010 | Mori et al. |
| 2015/0103771 A1 | 4/2015 | Kim et al. |

(Continued)

FOREIGN PATENT DOCUMENTS

| | | |
|---|---|---|
| CN | 104754759 A | 7/2015 |
| CN | 108307543 A | 7/2018 |

(Continued)

OTHER PUBLICATIONS

International Search Report and Written Opinion—PCT/CN2018/112704—ISA/EPO—May 29, 2019.

(Continued)

*Primary Examiner* — Anez C Ebrahim
(74) *Attorney, Agent, or Firm* — Procopio, Cory, Hargreaves & Savitch LLP

(57) ABSTRACT

Systems, apparatuses, and methods for configurations for small data transmission by which a user equipment transmits, to a base station, user data within a random access message in a radio resource control inactive state. The user equipment may receive, via broadcast system information and/or unicast messages from the base station, a configuration on support capability or parameters for small data transmission. Based on the received configuration, the user equipment may transmit user data to the base station. The (Continued)

user equipment may transmit a random access preamble on a resource separately reserved for small data transmission.

29 Claims, 10 Drawing Sheets

(51) Int. Cl.
  *H04W 74/00* (2009.01)
  *H04W 74/0833* (2024.01)

(56) References Cited

U.S. PATENT DOCUMENTS

| | | | |
|---|---|---|---|
| 2016/0374048 | A1 | 12/2016 | Griot et al. |
| 2018/0139778 | A1 | 5/2018 | Chou et al. |
| 2019/0230682 | A1* | 7/2019 | Tang ............... H04W 28/24 |
| 2019/0274182 | A1* | 9/2019 | Jia .................. H04W 80/02 |
| 2020/0053799 | A1 | 2/2020 | Jeon et al. |
| 2020/0214070 | A1* | 7/2020 | Ingale ............. H04W 74/0833 |
| 2020/0323018 | A1* | 10/2020 | Chen ............... H04W 76/10 |
| 2021/0352689 | A1* | 11/2021 | Jung .............. H04W 72/1268 |

FOREIGN PATENT DOCUMENTS

| | | |
|---|---|---|
| CN | 108616897 A | 10/2018 |
| WO | 2018142207 A1 | 8/2018 |

OTHER PUBLICATIONS

International Search Report and Written Opinion—PCT/CN2019/104646—ISA/EPO—Nov. 28, 2019.

InterDigital Communications: "2-Step Random Access Procedure in NR", 3GPP Draft, 3GPP TSG-RAN WG2 NR Ad Hoc, R2-1700237 (NR SI A13214 2-Step RACH), 3rd Generation Partnership Project (3GPP), vol. RAN WG2, No. Spokane, USA, Jan. 17, 2017-Jan. 19, 2017, Jan. 17, 2017 (Jan. 17, 2017), XP051210819, 3 Pages, Retrieved from Internet: URL: http://www.3gpp.org/ftp/Meetings_3GPP_SYNC/RAN2/Docs/ [Retrieved on Jan. 17, 2017] Section 2, p. 1-p. 3.

LG Electronics: "Data Transmission During Random Access Procedure in NB-IoT", 3GPP Draft, 3GPP TSG RAN WG1 Meeting 92, R1-1802168, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018 (Feb. 16, 2018), XP051397173, Retrieved from Internet: URL: http://www.3gpp.org/ftp/tsg%5Fran/WG1%5FRL1/TSGR1%5F92/Docs/ [Retrieved on Feb. 16, 2018] p. 3-p. 5.

Supplementary European Search Report—EP19879281—Search Authority—The Hague—Jun. 1, 2022.

* cited by examiner

CONFIGURATIONS FOR SMALL DATA TRANSMISSION

This application claims the benefit of and priority to International Patent Cooperation Treaty Application No. PCT/CN2018/112704, filed Oct. 30, 2018 and International Patent Cooperation Treaty Application No. PCT/CN2019/104646, filed Sep. 6, 2019, which are both hereby assigned to the assignee hereof and hereby expressly incorporated by reference herein as if fully set forth below and for all applicable purposes. The above identified application/document is expressly incorporated by reference in entirety herein as part of the disclosure of this application.

BACKGROUND

This disclosure relates generally to wireless communication, and more specifically, to techniques for configurations for small data transmission (SDT).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE).

UEs may be Internet of Things (IoT) devices that can wirelessly connect to a server, a network, or the Internet. In some cases, IoT devices may provide for automated or machine-type communication that allows the devices to communicate with one another or a base station without human intervention. For example, an IoT device may integrate sensors or meters to measure or capture information and relay that information to a central server or application program that can make use of the information or present the information to humans interacting with the program or application. In some cases, IoT devices may operate within a limited or narrow frequency band as opposed to a broad system bandwidth within which the IoT radio access technology is deployed. Many IoT UEs may operate in low power mode and may be implemented as low cost devices.

Compared to other types of UEs, some IoT devices may infrequently transmit a small amount of user data in short bursts. For example, a sensor device monitoring some environmental variable (e.g., temperature) may report a few packets of measurement data once every hour. The nature of small, infrequent data transmission may call for new solutions to improve efficiency of wireless communication networks serving IoT applications.

A public land mobile network (PLMN) refers to a network established and operated for providing land mobile telecommunications services to the public. A PLMN may be identified by the Mobile Country Code (MCC) and the Mobile Network Code (MNC). Each operator providing mobile services may have its own PLMN. PLMNs may interconnect with other PLMNs and public switched telephone networks (PSTN) for telephone communications or with internet service providers for data and internet access. A network may provide a UE one or more Equivalent PLMNs (E-PLMNs) that the UE should treat as equivalent, e.g., for the purposes of PLMN selection, cell selection/reselection, and handover.

A radio access network based notification area (RNA) may refer to a network area, containing one or more cells, within which a UE in a radio resource control inactive state generally need not send a location update to the network as the UE moves from one cell to another. Many RNAs may be established for a PLMN; one or more RNAs may belong to a tracking area.

SUMMARY

Systems, apparatuses, and methods are provided for configurations for small data transmission. In small data transmission, a UE may transmit, to a base station, user data within a random access message in a radio resource control (RRC) inactive state. The user equipment may receive, via broadcast system information and/or unicast messages from the base station, a configuration on support capability or parameters for small data transmission. The configuration may be provided on various levels of granularity, for example, per UE, per radio access network notification area, per data radio bearer, etc. Based on the received configuration, the UE may transmit user data to the base station. A UE may transmit a random access preamble on a resource separately reserved for small data transmission, and the transmitted random access preamble may indicate a size of the random access message carrying user data.

From an aspect, a method of wireless communication is provided. The method may be performed by a UE or component(s) thereof. A configuration may be received from a base station, regarding user data transmission within a random access message by the UE in an RRC inactive state. User data may be transmitted to the base station based on the received configuration.

From another aspect, a UE is provided. The UE may include a receiver configured to receive from a base station a configuration on user data transmission within a random access message by the UE in an RRC inactive state. The UE may also include a transmitter configured to transmit user data to the base station based on the received configuration.

From another aspect, an apparatus of wireless communication is provided. The apparatus may include means for receiving from a base station a configuration on user data transmission within a random access message by a UE in an RRC inactive state. The apparatus may also include means for transmitting user data to the base station based on the received configuration.

From another aspect, a non-transitory computer-readable medium, having instructions stored thereon, is provided. The instructions may include codes executable for a UE to perform receiving from a base station a configuration on user data transmission within a random access message by the UE in an RRC inactive state. The instructions may also include codes for transmitting user data to the base station based on the received configuration.

From various aspects, the configuration may be specific to a data radio bearer (DRB) of the UE. For example, the configuration may selectively enable the user data transmission for the DRB but not for a different DRB of the UE.

From various aspects, the configuration may be received in various ways. For example, an RRC release message may be received that contains the configuration. In response to the RRC release message, the UE may be suspended in the RRC inactive state.

From various aspects, a resource for a random access preamble may be determined from one or more resources reserved for the user data transmission within a random access message. The random access preamble may then be transmitted to a base station on the determined resource, wherein user data are to be transmitted within the random access message after the random access preamble by the UE in an RRC inactive state.

From various aspects, the transmitted random access preamble may be selected from one of multiple groups of one or more random access preambles, wherein each of the multiple groups may be associated with a different maximum transport block size of the random access message.

From yet another aspect, a method of wireless communication by a base station is provided. The base station may transmit to a user equipment a configuration on user data transmission within a random access message by the UE in an RRC inactive state. The base station may receive user data from the UE based on the configuration.

From another aspect, a base station is provided. The base station include a transmitter configured to a user equipment a configuration on user data transmission within a random access message by the UE in an RRC inactive state. The base station may also include a receiver configured to receive user data from the UE based on the configuration.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

DETAILED DESCRIPTION

Small data transmission may present an attractive solution in some IoT applications, wherein a small amount of user data is transmitted by a UE in an RRC inactive state. SDT may speed up user plane data transmission of small amount of user data (e.g., in a random access message as descried in detail below). The UE may stay in RRC inactive state without transitioning into RRC active state, thereby lowering power consumption and reducing signaling overhead. However, unlike the baseline method of data transmission during RRC connected state (or "regular data transmission"), SDT may not be ubiquitously supported by wireless communication networks and operators. To better utilize SDT, an SDT-capable UE may need to know whether or not a network supports SDT and/or what kind of SDT methods (or generally SDT parameters) the network supports. The networks may also adapt SDT support to deployment scenarios or service differentiations.

As elaborated herein, a network may provide SDT configuration by broadcast and/or unicast. For example, the configuration may be included in system information broadcasted to all UEs in a cell. The configuration may also be included in an unicast message (e.g., RRC release message) to a particular UE, indicating network SDT supported behavior on a per-UE basis. Additionally, SDT may be selectively configured with respect to a data radio bearer (DRB).

Furthermore, separate random access channel resource may be used for SDT access method, which may improve the usage of frequency resource, reduce the retransmission of random access message (carrying user data), and/or reduce user plane transmission latency.

Aspects of the disclosure introduced above are described below in the context of a wireless communication system. Illustrative and non-limiting examples of designs and techniques supporting configurations for small data transmission are then described. Aspects of the disclosure are illustrated by and described with reference to various apparatus diagrams, system diagrams, and flowcharts.

Figure 1:
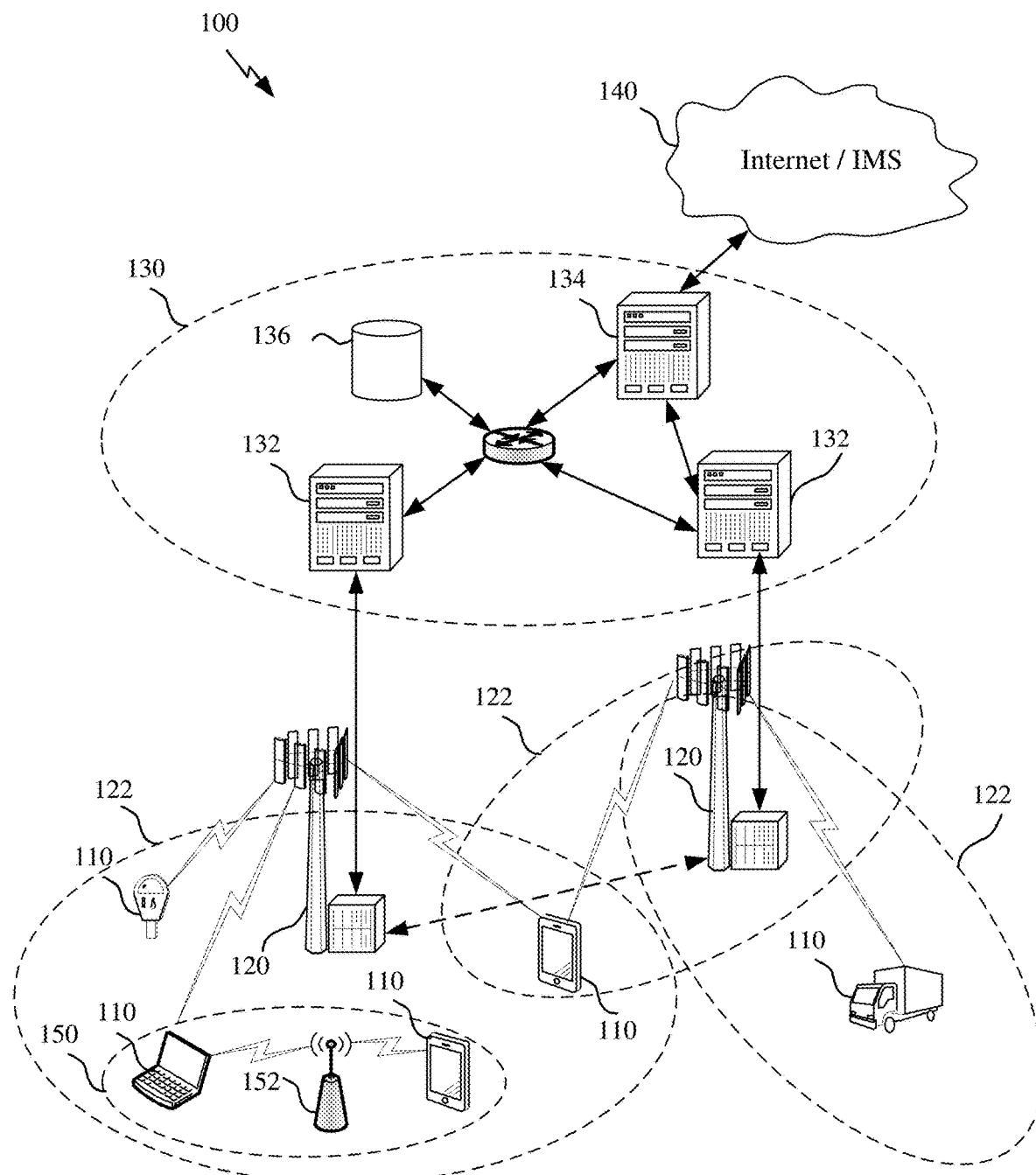
FIG. 1 illustrates a wireless communication system in accordance with the present disclosure.

FIG. 1 illustrates, as an example, a wireless communication system 100 in accordance with the present disclosure. The wireless communication system 100 generally include user devices (e.g., UEs 110) and network devices (e.g., base stations 120 and entities of a core network 130). Examples of the wireless communication system 100 may include various wireless network technologies, such as LTE or NR, as developed and standardized by the Third Generation Partnership Project (3GPP).

A user equipment generally refers to a device (e.g., of an end-user) that utilizes wireless communication service provided by a wireless communication network. As illustrated, a UE 110 may take a variety of forms, such as a cellphone, a computation device, a machine-type-communication (MTC) or Internet-of-Things (IoT) device, or a vehicular device, and so on. UEs 110 may be dispersed throughout the wireless communication system 100, and each UE 110 may be stationary or mobile. As used herein, a "user equipment" may also be referred to as a subscriber station, an access terminal, a remote terminal, a handset, a user device, or generally a wireless communication device or some other suitable terminology in the context.

A base station generally refers to a network device that communicates wirelessly (e.g., via over-the-air radio channel) with user devices. Base stations 120 may communicate with one another and/or with the core network 130, e.g., through backhaul links or other network nodes. Base stations 120 often serve as entry points for a user equipment to access communication services provided by a wireless communication network. Base stations 120 (and in some examples, with other entities) may constitute a radio access network (RAN), which connects UEs 110 to the core network 130 via certain radio access technology (RAT), such as LTE or NR. As used herein, a "base station" may also be referred to as a base transceiver station, a radio base station, an access point, or some other suitable terminology in the context.

In general, a base station 120 may communicate with a UE 110 using communication resources in time, frequency, and/or space. Communication may occur in two directions: "downlink" (or "forward link") from the base station 120 to the UE 110; or in reverse, "uplink" (or "reverse link") from the UE 110 to the base station 120. Downlink and uplink transmissions may take place on same or different frequency bands and during same or different time instances. In terms of time resources, time intervals of transmission may be organized according to a "frame" structure. A frame may further be divided into a number of subframes or slots, each further containing a number of symbols, and so on. In terms of frequency resources, a variety of frequency bands (e.g., ranging from ultra-high frequency to extremely-high frequency) may be used. The frequency bands may be "licensed" (e.g., to an operator exclusively), or "unlicensed" (or "shared") (e.g., shared by general users subject to interference and coexistence regulation). On a frequency band, a "carrier" may generally refer to a set of radio frequency spectrum resources supporting uplink and/or downlink communication, such as transmission of physical signals or channels. In some examples a carrier may be made up of multiple sub-carriers (e.g., waveform signals of multiple different frequencies). In terms of spatial resources, base stations 120 and/or UEs 110 may communicate on one or more (physical or virtual) antenna ports, for example, based on various single-user or multi-user, Multiple-Input and Multiple Output (MIMO) techniques, such as spatial diversity, multiplexing, or beamforming, and so on. Multiple antennas may be co-located or distributed in diverse geographic locations.

A base station 120 may operate one or more "cells" 122. The term "cell" generally refers to a logical entity used for communication with a base station (e.g., over one or more carriers), and in some context, may also refer to a portion of a geographic coverage area (e.g., a sector) over which the logical entity operates. An identifier (e.g., a cell identity) may be associated with a cell to distinguish the cell from another cell. A UE 110 may register and communicate with one or more cells 122 (e.g., serving cells) while monitoring other cells 122 (e.g., neighbor cells).

The core network 130 may include a network of elements providing user authentication, voice/multimedia communications, Internet Protocol (IP) connectivity, and/or other application services. These elements may be referred to as nodes, servers, gateways, functions, or other suitable terminologies. Examples of the core network 130 may include an evolved packet core (EPC) in a LTE network, a 5G Core (5GC) in a 5G or NR network, or generally, other packet based network architecture. The core network 130 may separate user plane function from control plane function, for example, as in 5GC. A base station 120 in a radio access network may communicate with an element 132 to access services of the core network 130. The element 132 may incorporate a mobility management entity (MME) and/or a serving gateway (SGW), as in EPC, to implement control plane and/or user plane protocols. In other examples, the element 132 may separate control plane and user plane function into two entities such as a core access and mobility management function (AMF) and a user plane function (UPF) in 5GC. The element 132 may manage non-access stratum (e.g., control plane) functions such as mobility, authentication, and bearer management for UEs 110 served by the base station 120. The element 132 may also route user data to another element 134 connected to a packet data network (PDN) 140. The element 134, such as a PDN gateway (PGW) of EPC or a UPF of 5GC, may transport IP packets between the PDN 140 and a UE 110 accessing the PDN 140 via a base station 120 and the core network 130. The element 134 may also provide IP address allocation as well as other functions. The core network 130 may also include other nodes or entities. For example, subscriber information or user profile may be stored in a server 136, such as a home subscriber server (HSS), which may be queried, e.g., for user authentication, registration, or billing, etc.

In general, a packet data network may be any packet (e.g., IP) based network. A UE 110 may communicate with the PDN 140 for a variety of applications or services. Examples of the PDN 140 may include an operator's service network, an IP Multimedia Subsystem (IMS), or generally the Internet. The IMS may provide voice, video, or other multimedia applications (such as voice over IP call) across various types of communication networks.

The wireless communication system 100 may be a packet-based network that operate according to a layered protocol stack. In the user plane, communication on a bearer at Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, a Radio Resource Control (RRC) protocol layer may provide establishment, configuration, and maintenance of an RRC connection between a UE 110 and a base station 120 or core network 130 supporting radio bearers for user plane data. At a Physical (PHY) layer, transport channels may be mapped to physical channels, which are transmitted over a physical wave-propagation medium (e.g., over the air or space).

Besides communicating with a wireless wide area network (WWAN), a UE 110 may communicate with a wireless local area network (WLAN), such as a Wireless-Fidelity (Wi-Fi) network. A WLAN 150 may include a wireless access point (AP), such as a wireless "hotspot" or "router" coupled to the Internet. A user device served by a wireless access point may also be referred to as an access terminal (AT). An AP 152 may wirelessly communicate with a UE 110 and may relay packetized communication data (e.g., IP packets) between the UE 110 and the Internet (or another AT). A WWAN (e.g., the core network 130) may support inter-networking (including aggregation) with a WLAN, and a UE 110 may communicate with both a base station 120 and an AP 152.

For illustrative purposes, the following examples and figures may be described with reference to the user or network devices of FIG. 1; however, other types of user or network devices may be used in same or other examples without limiting the scope of the present disclosure.

Figure 2:
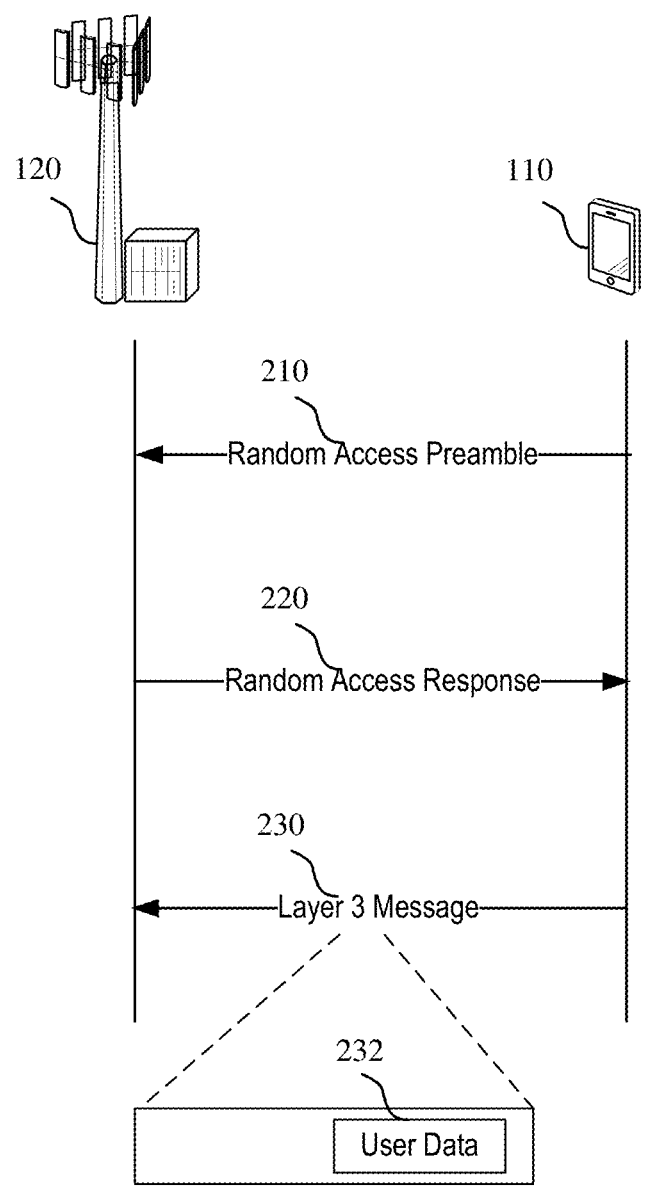
FIG. 2 illustrates transmission of user data within a random access message by a UE in an RRC inactive state.

FIG. 2 illustrates, as an example, transmission of user data within a random access message by a UE in an RRC inactive state. Generally speaking, a UE is either in RRC connected state or in RRC inactive state when an RRC connection has been established, or otherwise, if no RRC connection, in an RRC idle state. Transmission of user data generally takes place during a RRC connected state in which radio and network communication resource configurations (e.g., access stratum context) has been established for an RRC connection. In contrast, a UE in RRC idle state may camp on a cell, monitor paging, but may not transmit user data due to, e.g., a lack of a valid access stratum context. The RRC inactive state can be viewed as an intermediate state between RRC connected state and RRC idle state: Like RRC connected state, the RRC inactive state may maintain a valid access stratum context, but in many other respects, the RRC inactive state may behave similarly to RRC idle state, e.g., with respect to cell camping, page monitoring, etc.

In some IoT applications, an IoT device may be put in a discontinuous reception (DRX) cycle in RRC inactive state, waking up occasionally to transmit a small amount of user data (such as sensor data collected by the IoT device). For relatively infrequent user data (for example, those less than a thousand bytes or often as few as several hundred bytes or even smaller), transitioning a UE into RRC connected state for purposes of sending the user data may become inefficient because signaling overhead associated with RRC state transition may be relatively large compared to the amount and/or frequency of user data. Since a UE in RRC inactive state may retain an established RRC connection with the network (e.g., having a valid access stratum context), the UE may utilize a random access procedure in RRC inactive state to transmit user data without first transitioning to RRC connected state. Such mode of user data transmission may be colloquially referred to as "small data transmission."

A UE 110 may initiate random access by sending to a base station 120 a random access preamble 210 (or "Message 1"). The random access preamble 210 may be selected from one or more sequences, corresponding to an index identifying the selected sequence. In LTE or NR, the random access preamble 210 may be transmitted over a Physical Random Access Channel (PRACH). The base station 120, if detecting the random access preamble 210, may reply with a random access response 220 (or "Message 2"), which may include an uplink grant assigning communication resources for a layer 3 message 230 sent from the UE 110 to the base station 120. The layer 3 message 230 (or "Message 3") may contain RRC signaling, such as RRC connection request message or RRC connection re-establishment request message. The layer 3 message 230 may include or encapsulate user data 232 with or without other payload (e.g., RRC signaling). The user data 232 generally refer to user plane, application data and are distinguished from control plane data (e.g., RRC signaling or non-access stratum data). The RRC protocol stack in the base station 120 may pass the user data 232 to a user plane protocol stack for further processing of the user data 232, using the access stratum context maintained in the RRC inactive state, for example, forwarding it to the core network.

Since user data may be transmitted in a random access message (e.g., Message 3) normally before a UE transits to RRC connected state, the technique illustrated in FIG. 2 may be also referred to as "early data transmission" (EDT).

Absent device level pre-configuration, a UE capable of small data transmission, e.g., as described with reference to FIG. 2, may need to know whether a base station, a RAN-based notification area, and/or a public land mobile network supports small data transmission and/or which method (i.e., design, scheme, or embodiment) of small data transmission is supported along with relevant SDT parameters (collectively referred to as "SDT configurations"). An SDT configuration may be implemented in various forms. For example, an SDT configuration field may take a Boolean value (e.g., "true" or "false") indicating whether or not small data transmission is supported. If multiple SDT methods are supported by the network, the SDT configuration field may take an enumerated value (e.g., "method1, method2, etc.") indicating which method is supported. A network may provide SDT configurations in variety of ways as described in details below.

Figure 3:
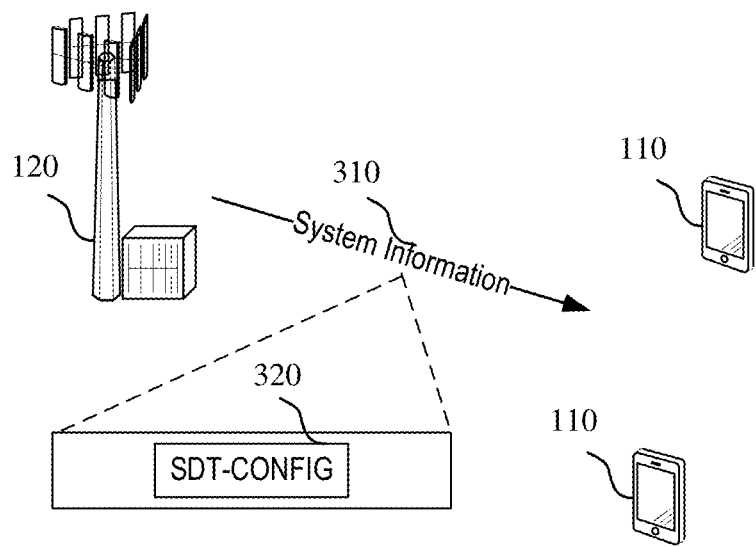
FIG. 3 illustrates a broadcast configuration for small data transmission.

FIG. 3 illustrates, as an example, a broadcast configuration for small data transmission. A base station 120 may include an SDT configuration 320 in system information 310 broadcasted to all UEs (e.g., a UE 110) in a cell. In some systems, the system information 310 may contain a System Information Block 1 (SIB1), which may, e.g., in NR, carry a cell access information element such as "CellAccessRelatedInfo." Among various fields included in the CellAccessRelatedInfo may be a PLMN identity list (e.g., "plmn-identityList" field) and an RNA code (e.g., "ranac" field). An SDT configuration field (e.g., "SDT-SNB" standing for SDT-supported network behavior) may be included in the CellAccessRelatedInfo. In some examples of network implementation, same SDT configurations (or supported network behavior) may be used across RAN nodes (e.g., base stations) within a RAN-based notification area.

Figure 4:
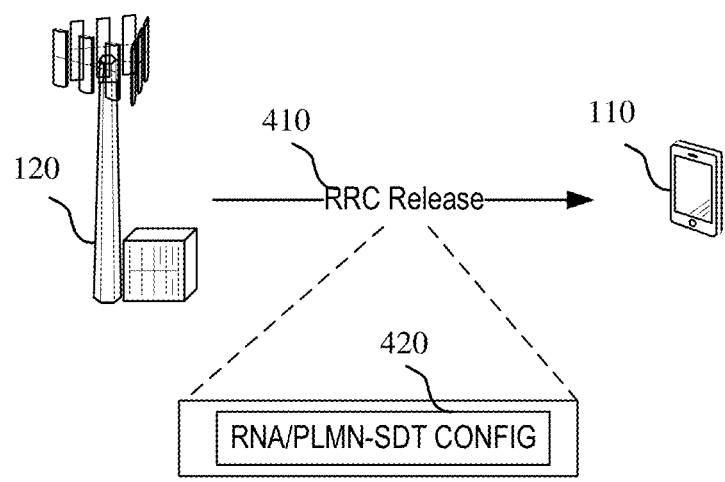
FIG. 4 illustrates a unicast configuration for small data transmission.

FIG. 4 illustrates, as an example, a unicast configuration for small data transmission, by which a base station 120 may configure SDT on an individual UE basis. The base station 120 may send an RRC release message 410 (e.g., "RRCRelease" in NR) to a UE 110, suspending an RRC connection and transitioning the UE 110 to RRC inactive state. The RRC release message 410 may contain an RNA/PLMN-SDT configuration 420 signaling to the UE 110 its SDT configurations on various levels of granularities: for example, whether the RNA/PLMN-SDT configuration 420 applies to all cells in an RNA, a PLMN, or all the equivalent PLMNs. In some examples, the RNA/PLMN-SDT configuration 420 may be part of suspension configuration (e.g., a "suspendConfig" field included in RRCRelease) relating to RRC connection suspension. In a NR network, the RRC release message 410 (or its suspension configuration) may include an information element "RAN-NotificationAreaInfo" containing a "cellList" that lists cell identities of one or more RNAs of one or more PLMNs. An "all-PLMN" level SDT configuration may be placed along with the cellist in the RAN-NotificatonAreaInfo, indicating SDT configuration for all the equivalent PLMNs associated with the cellList. (For example, RAN-NotificationAreaInfo::=CHOICE {cellList, ranAreaConfigList, SDF-SNB, . . . }.) Alternatively or additionally, a "per-PLMN" level SDT configuration may be placed within the cellList in the RAN-NotificationAreaInfo, indicating SDT configuration for a particular PLMN associated with the cellList. (For example, an SDT configuration field, e.g., "SDT-SNB," may be placed inside a per-PLMN cell list (e.g., "PLMN-RAN-AreaCell"), contained within the cellList, as PLMN-RAN-AreaCell::=SEQUENCE {plmn-identity, ran-AreaCells, SDT-SNB, . . . }.). Furthermore, a "per-RNA" level SDT configuration may be placed within an RNA cell list (e.g., "ran-AreaCells") of a PLMN, indicating SDT configuration for a particular RNA of the particular PLMN.

Through the use of unicast configuration, different UEs in the same cell can have different SDT configurations. A UE may receive both the broadcast and the unicast configurations, but the unicast configuration may overwrite broadcast configuration. For example, even if a SIB1 broadcast indicates SDT is supported, a base station may selectively turn off SDT for a particular UE using an appropriate unicast SDT configuration, e.g., in a RRC release message 410 sent to the UE. Furthermore, a unicast configuration of a finer granularity may overwrite a coarser one. For example, an RNA level configuration may control the actual SDT configuration, despite a conflicting PLMN level configuration.

Figure 5:
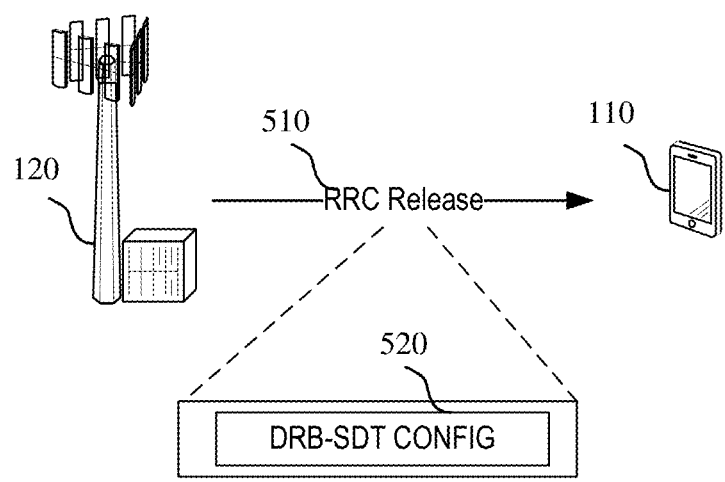
FIG. 5 illustrates a unicast configuration for small data transmission.

FIG. 5 illustrates, as another example of unicast configuration, data radio bearer configuration for small data transmission. A base station 120 may send an RRC release message 510 (e.g., "RRCRelease" in NR) to a UE 110, suspending an RRC connection and transitioning the UE 110 to RRC inactive state. When suspended in RRC inactive state, the UE 110 may have multiple data radio bearers (DRBs), some of which may be set up with different quality of service requirements. For example, some DRBs may support small traffic volume with infrequent burst, while others may not. If uplink data would trigger transmission in a DRB associated with large traffic volume, it may be more efficient for the UE 110 to transit to RRC connected state for data transmission. On the other hand, if uplink data would trigger transmission in a DRB associated with small traffic volume and infrequent burst, it may be more efficient for the UE 110 to stay in RRC inactive state for data transmission, e.g., via small data transmission.

For per-DRB configuration, the RRC release message 510 may contain a DRB-SDT configuration 520 addressed to one or more data radio bearers. Multiple DRB-SDT configurations 520 can be used to signal SDT configurations for multiple or multiple groups of DRBs. For each DRB-SDT configuration 520, the RRC release message 510 may explicitly include an associated DRB identity information to identify corresponding DRB or DRBs to which the DRB-SDT configuration 520 would apply. In some cases, the DRB identity information may not be explicitly present in the RRC release message 510, when no ambiguity should arise regarding which DRB or DRBs the DRB-SDT configuration 520 would apply to. By configuring SDT on a per-DRB basis (e.g., SDT permission on a DRB), a network may allow a UE to transmit user data on some specific data radio bearers in RRC inactive state—e.g., when these DRBs are setup for small user traffic, whereas data transmission over other bearers may occur only after the UE has exited RRC inactive state and entered RRC connected state.

In general, the broadcast and various unicast network configurations described above with reference to FIGS. 3-5 are not mutually exclusive with each other and can be combined in various respects. For example, a network may provide SDT configuration in broadcast system information to provide a cell-level default SDT configuration, and depending on a particular UE, may selectively control various aspects of SDT (e.g., RNA/PLMN level and/or DRB level) as applied to the particular UE via one or more unicast RRC messages.

Figure 6:
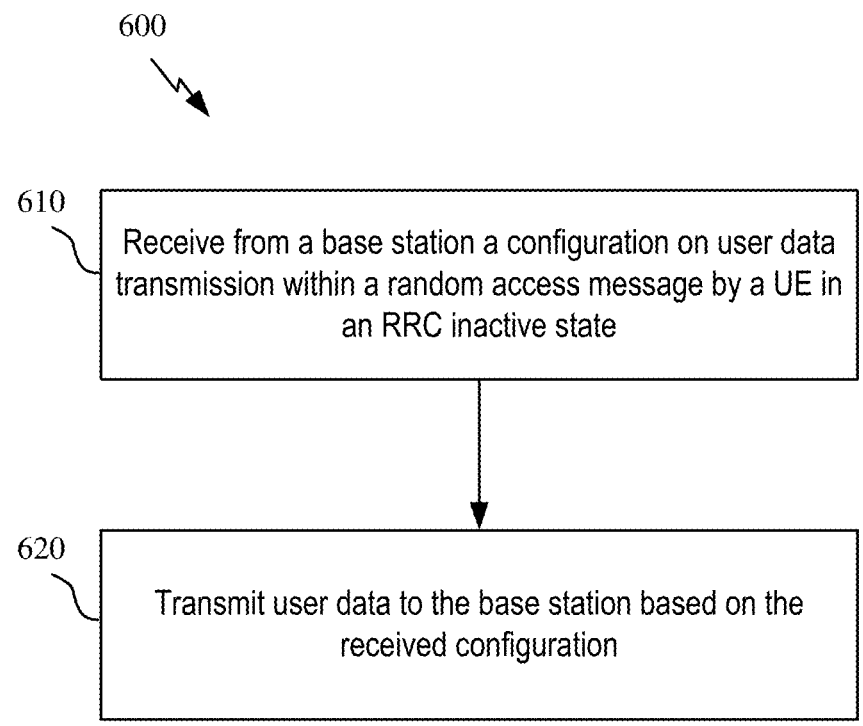
FIG. 6 illustrates a method of wireless communication that supports configurations for small data transmission in accordance with the present disclosure.

FIG. 6 illustrates, as an example, a method 600 of wireless communication that supports configurations for small data transmission in accordance with the present disclosure. The method 600 may encompass various aspects of the techniques described with reference to FIGS. 2-5. A UE (or one or more of its components) may implement the method 600 using hardware, firmware, or software, or a combination thereof.

At 610, a UE may receive from a base station a configuration on user data transmission within a random access message by the UE in a radio resource control inactive state. The user data transmission encompasses various aspects of the small data transmission or earlier data transmission described with reference to FIG. 2. For example, the amount of user data (from user applications) may be small (e.g., a few hundreds or thousands of bytes or even smaller), which may correspond to infrequent bursts of sensor data transmission by some IoT UEs. The UE may encapsulate the user data in a random access message (e.g., the layer 3 message 230 of FIG. 2) and transmit the user data to the base station while remaining in RRC inactive state rather than transitioning into RRC connected state, thus saving signaling overhead in some IoT applications.

The configuration may generally specify the support capability (including permission) of the user data transmission in RRC inactive state (such as SDT). For example, the configuration may indicate whether the base station (or generally a network) supports user data transmission within the random access message by the UE in the RRC inactive state. Furthermore, if the user data transmission is supported, the configuration may indicate which method (or parameters) of the user data transmission is supported.

The network may provide the configuration in various ways, such as, e.g., via broadcast, unicast, or a combination thereof, as described with reference to FIG. 3-5. A base station may broadcast the configuration in system information of a cell; a UE may receive a system information block containing the configuration. The broadcast configuration generally applies to all UEs in the cell. On the other hand, a base station may individually configure a UE using a dedicated, unicast message to the UE, e.g., through RRC release messages described with reference to FIGS. 4 and 5. As the configuration specifies UE/network behavior pertaining to user data transmission in RRC inactive state, a base station may provide the configuration in a message relating to RRC inactive state. For example, the RRC release messages 410 or 510 suspending the UE to RRC inactive state (described in FIGS. 4 and 5) may carry the configuration in the respective message, but other types of messages may be used. The configuration may apply to a radio access network notification area (RNA) of a public land mobile network (PLMN). The configuration may apply at a higher granularity level, e.g., to all RNAs of a particular PLMN or all the equivalent PLMNs. The placement of the configuration field (e.g., "SDT-SNB") in relation to other fields in an RRC message may indicate which granularity level the corresponding configuration would apply, as described with reference to FIG. 4. In addition, the configuration may apply to a data radio bearer, e.g., as described with reference to FIG. 5. The data radio bearer configuration may be used in conjunction with other configuration methods; for example, the per-DRB configuration may specify which DRB among multiple DRBs to be used for small data transmission, when UE is already permitted, via a RNA/PLMN configuration, to transmit user data within a random access message in RRC inactive state.

At 620, a UE may transmit user data to the base station based on the received configuration. If the configuration (together with potentially other configurations) indicates the user data transmission as in 610 (e.g., small data transmission) is not supported (e.g., "SDT-SNB" field is set to "false"), the UE may transit from RRC inactive state to RRC connected state, and may transmit user data, e.g., using regular data plane protocols (e.g., over an uplink shared data logical channel for user traffic) rather than using a control plane message (such as a random access message) to encapsulate user data.

If the configuration indicates the user data transmission is supported, the UE may transmit user data within a random access message while remaining in RRC inactive state, e.g., as described with reference to FIG. 2. For example, the UE may encapsulate the user data in the layer 3 message 230 to be transmitted during random access to the base station.

Figure 7:
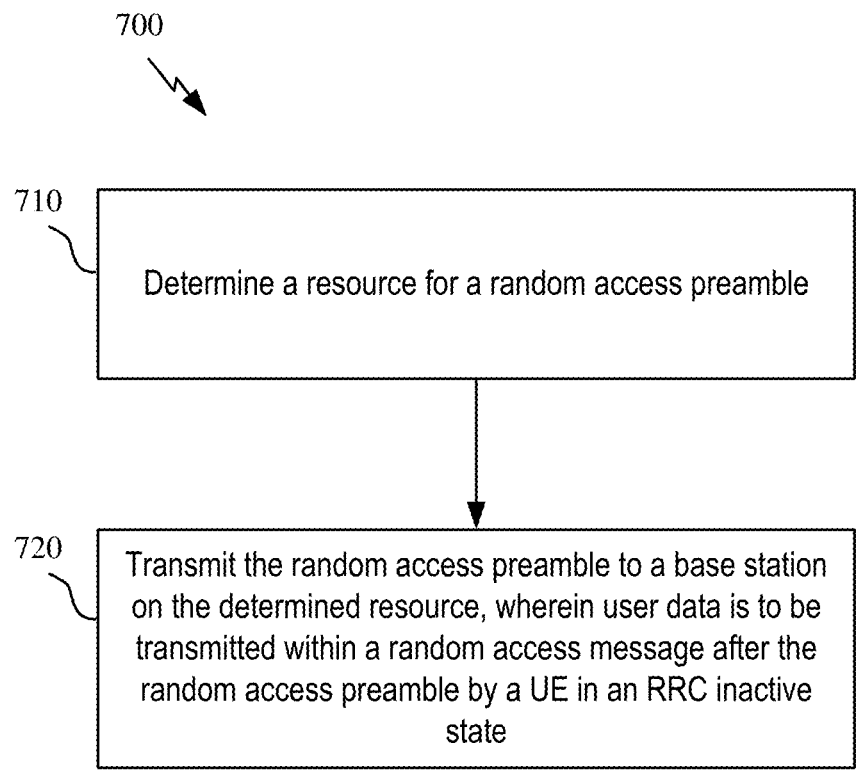
FIG. 7 illustrates a method of wireless communication that supports configurations for small data transmission in accordance with the present disclosure.

FIG. 7 illustrates, as an example, a method 700 of wireless communication that supports network configurations for small data transmission in accordance with the present disclosure. The method 700 may encompass various aspects of the random access procedure and user data transmission described with reference to FIG. 2. In addition, the method 700 may be combined with the method 600 described with reference to FIG. 6. For example, after a UE obtains an SDT configuration as in the method 600, the UE may transmit a random access preamble according to the method 700. A UE (or one or more of its components) may implement the method 700 using hardware, firmware, or software, or a combination thereof.

At 710, a UE may determine a resource for a random access preamble. At 720, a UE may transmit the random access preamble to a base station on the determined resource, wherein user data is to be transmitted within a random access message after the random access preamble by the UE in a radio resource control inactive state. The resource may generally refer to any type of communication resources, such as, in terms of time/frequency locations or sequence indices for random access preambles. For example, in a NR network, random access preamble may be transmitted in one of Bandwidth Parts (BWP) within the overall system bandwidth and using a sequence from one of preamble groups.

The resource may be a common resource used for other types of initial access wherein the random access message (e.g., the layer 3 message 230) does not contain user data. In some examples, a base station (or a network) may signal (e.g., in system information) a single level of maximum transport block size for a random access message, and a particular preamble group (e.g., the "Group B" in LTE or NR) may be designated for purposes of user data transmission within a random access message. Although when receiving a random access preamble from the particular preamble group, a base station can be informed that a subsequent random access message may carry user data, the base station may not know the actual size of the random access message (as compared to the single maximum transport block size). To accommodate worst case scenarios, the base station may respond with an uplink link grant (e.g., part of the random access response 220) allocating a maximum amount of resources (e.g., number of resource blocks) corresponding to the maximum transport block size, even though the actual size of the random access message may be much smaller, leading to waste of uplink resources. Alternatively, the base station may estimate the amount of resources (e.g., through some past history or statistics of the usage pattern), but may cause multiple retransmissions of the random access message if the estimated amount of resources turns out to be insufficient.

On the other hand, the resource may be a separate resource for the specific type of random access involving user data transmission (e.g., SDT described in FIG. 2), while other types of random access use other (or common) resources. In some examples, a base station may signal the separate resources (e.g., SDT-only resources) using system information broadcast. A UE may receive system information from the base station, wherein the system information indicates one or more resources (e.g., one or more BWPs in NR) separately reserved for purposes of user data transmission within the random access message (e.g., SDT). By using the SDT-only resources, a UE can inform the base station of an impending small data transmission during the random access procedure.

Additionally, a number of random access preamble sequences, used on the separate (e.g., SDT-only) resources, may be partitioned into multiple groups. A UE may select a random access preamble from one of multiple groups of one or more random access preambles, wherein each of the multiple groups may be associated with a different maximum transport block size of a random access message. For example, 64 preamble sequences may be divided into 4 groups: group 1 corresponding to L/4; group 2 corresponding to L/2; group 3 corresponding to 3L/4; group 4 corresponding to L, wherein L denotes the largest transport block size of a random access message (e.g., the layer 3 message 230) across all the groups. In general, multiple different levels of maximum transport block sizes need not be set uniformly as in the preceding example. Each group may have one or more preamble sequences, and the total number of preamble sequences may be distributed non-uniformly among the multiple groups (e.g., one group may have more sequences than another group). A UE may randomly select a random access preamble from a group to transmit to a base station, initiating random access procedure.

Partitioning preamble sequences into multiple groups provides a finer level of granularity in signaling actual sizes of random access messages. A UE may choose a group whose maximum transport block size could be more presentative of the actual size of the random access message than another group could. In some numerical examples, the actual size may be quantized to the nearest upper bound among the multiple levels of maximum sizes. By selecting a preamble sequence from a particular group, a UE can implicitly indicate to a base station a particular range in actual size of a random access message (or a buffer size). In response, the base station may allocate a corresponding amount of uplink resources (e.g., a suitable number of resource blocks) for transmission of the random access message. The implicit signaling in actual message size may bring various benefits such as avoiding waste of uplink resources, reducing probability of retransmissions of the random access message, and/or reducing user plane transmission latency.

Figure 8:
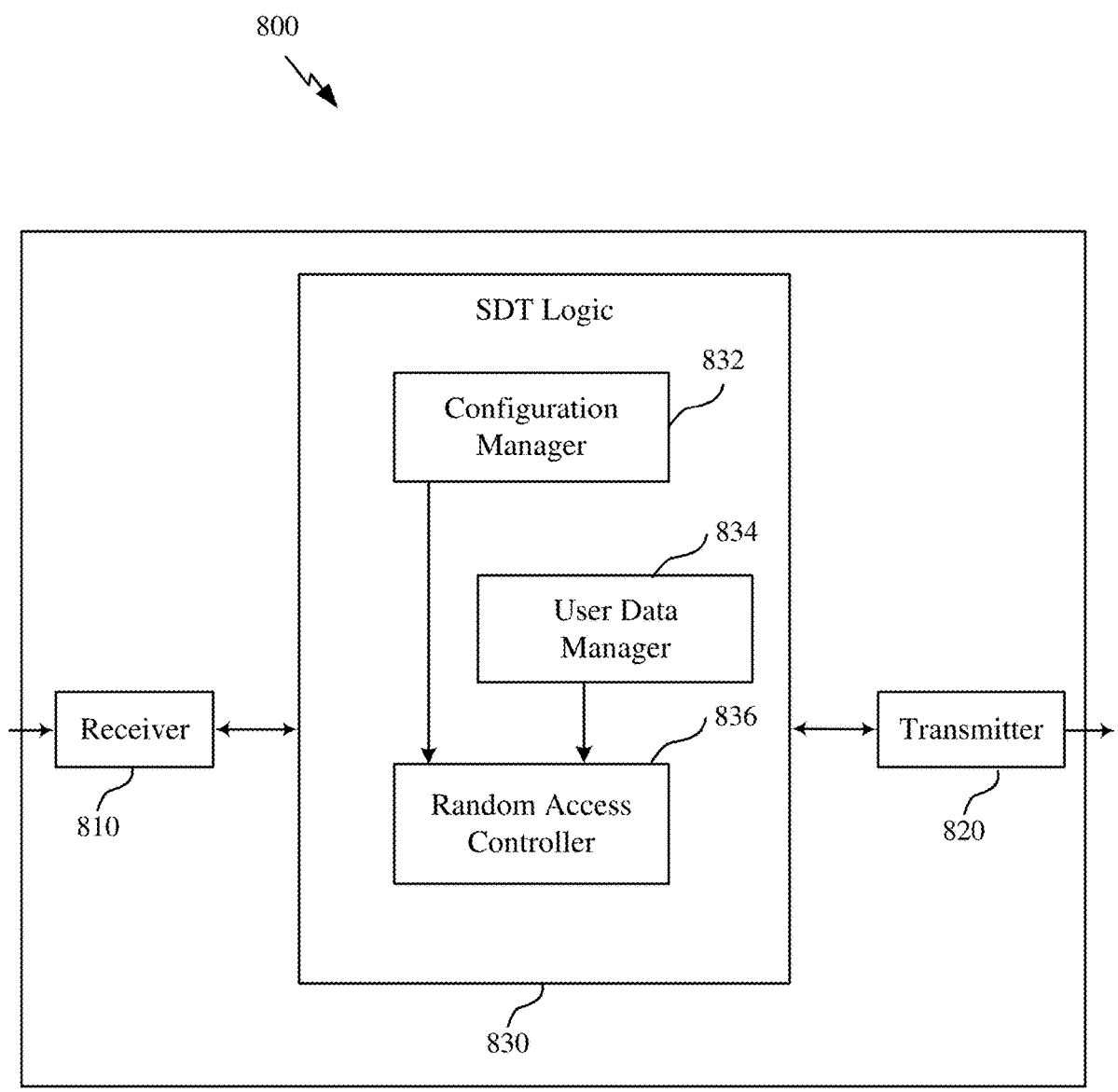
FIG. 8 illustrates an apparatus of wireless communication that supports configurations for small data transmission in accordance with the present disclosure.

FIG. 8 illustrates, as an example, an apparatus 800 that supports configurations for small data transmission in accordance with the present disclosure. The apparatus 800 may include a receiver 810, a transmitter 820, and an SDT logic 830, and may perform various aspects of the methods 600 and/or 700 described with reference to FIGS. 6 and 7. The apparatus 800 may be embodied by, or reside within, a UE 110 with reference to FIG. 1.

The receiver 810 may be configured to receive signals or channels carrying information such as packets, user data, or control information associated with various information channels. Information may be passed on to other components of the apparatus. The receiver 810 may utilize a single antenna or a set of multiple antennas.

The receiver 810 may provide means for receiving from a base station a configuration on user data transmission (e.g., SDT) within a random access message by a UE in an RRC inactive state. For example, the receiver 810 may receive a system information broadcast (e.g., the system information 310) and/or a unicast message (e.g., the RRC release message 410 or 510), which carries the configuration. In some implementations, the receiver 810 may be configured to perform the method 600 at 610 described with reference to FIG. 6. Additionally, the receiver 810 may be configured to receive random access response from a base station, e.g., as described with reference to FIG. 2.

The transmitter 820 may be configured to transmit signals or channels generated by other components of the apparatus. In some examples, the transmitter 820 may be collocated with a receiver 810 in a transceiver module. The transmitter 820 may utilize a single antenna or a set of multiple antennas.

The transmitter 820 may provide means for transmitting user data to a base station based on the configuration received by the receiver 810. The transmitter 820 may transmit user data using SDT, as generally described with reference to FIG. 2, if the configuration indicates that SDT is supported; or if otherwise, using regular data plane protocols rather than within a control plane RRC message. In some implementations, the transmitter 820 may be configured to perform the method 600 at 620 described with reference to FIG. 6.

The transmitter 820 may also provide means for transmitting a random preamble to a base station on a determined resource. For example, the transmitter 820 may transmit a random access preamble (e.g., over a physical random access channel) and a random access message (e.g., over a physical uplink shared channel). The random access message may encapsulate user data as in small data transmission. In some implementations, the transmitter 820 may be configured to perform the method 700 at 720 described with reference to FIG. 7.

The receiver 810 and transmitter 820 (or a transceiver incorporating both) may be coupled to the SDT logic 830 and may provide means for communication between the apparatus 800 and a base station.

The SDT logic 830 may be a baseband modem or an application processor or may illustrate aspects of a baseband or application processor. The SDT logic 830 or at least some of its various sub-components may be implemented in hardware, software executed by a processor, firmware, or any combination thereof. Software may comprise codes or instructions stored in a memory or like medium that is connected or in communication with the processor described above. The codes or instructions may cause the processor, the apparatus 800, a UE 110, or one or more components thereof to perform various functions described herein.

The SDT logic 830 may control, coordinate, or execute various functions supporting configurations for small data transmission. The SDT logic 830 may further include a configuration manager 832, a user data manager 834, and a random access controller 836.

The configuration manager 832 may extract, analyze, and/or maintain SDT related information (or parameters). For example, the configuration manager 832 may parse an SDT-configuration field contained in system information or an RRC release message. The configuration manager 832 may determine whether SDT is supported (or which method is supported), on which level of granularity (e.g., RNA or PLMN or DRB) the SDT configuration would apply, for example, as described with reference to FIGS. 3-5. Furthermore, the configuration manager 832 may resolve potentially overlapping or conflicting SDT configurations; for instance, a unicast configuration may overwrite a broadcast configuration.

The user data manager 834 may manage various aspects of user data transmission. For regular uplink data, when SDT is not supported or enabled, the user data manager 834 may invoke user plane protocols for data transmission by a UE in RRC connected state. For SDT, the user data manager 834 may coordinate with the configuration manager 832 and the random access controller 836 to transmit user data using a random access message while the UE stays in RRC inactive state. In some examples, the user data manager 834 may cause RRC state transition, for example, from RRC inactive to RRC connected.

The random access controller 836 may provide means for determining a resource for a random access preamble and may, for example, be configured to perform the method 700 at 710 described with reference to FIG. 7. The random access controller 836 may generally control and manage various UE operations regarding random access: for example, transmitting to a base station a random access preamble, receiving a random access response from the base station, transmitting a random access message to the base station, as described with reference to FIG. 2. The random access message may include user data within its payload if SDT is supported and enabled.

The random access preamble may be transmitted on a separate resource (e.g., SDT-only) or a common resource shared with other (non-SDT) types of random access procedure. The random access controller 836 may receive system information (e.g., via the receiver 810), wherein the system information indicates one or more resources separately reserved for purposes of user data transmission (e.g., SDT) within the random access message.

The random access controller 836 may also provide means for selecting the to-be-transmitted random access preamble from one of multiple groups of one or more random access preambles. As described with reference to FIG. 7, each group of the multiple groups may be associated with a different maximum transport block size of a random access message (which may contain user data during SDT). The selected group (from which a random access preamble may be randomly selected and transmitted to the base station) can inform the base station of information regarding actual size of an ensuring random access message. Correspondingly, the base station may adjust uplink resource allocation to better fit the actual message size.

Figure 9:
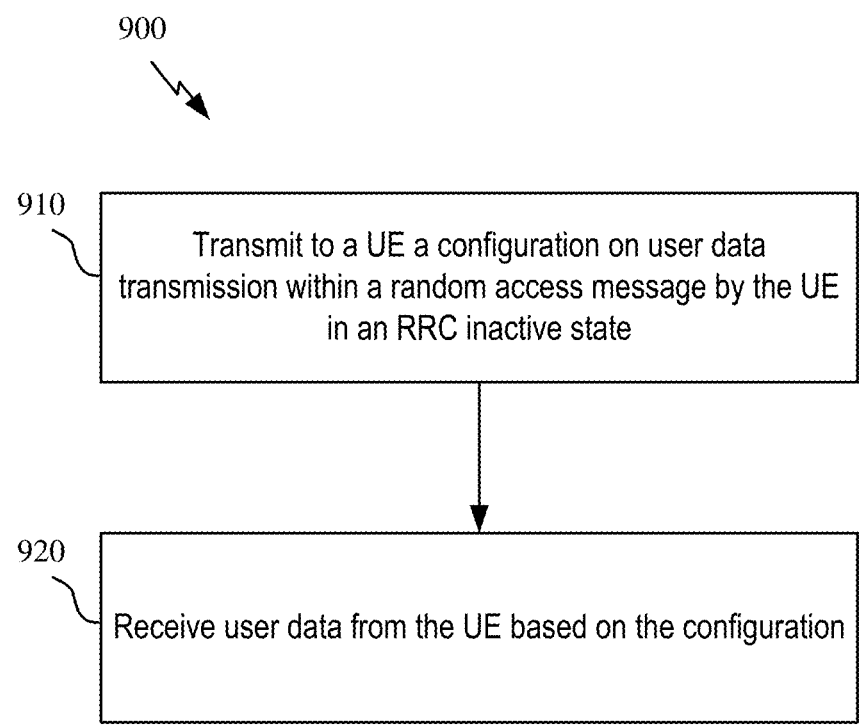
FIG. 9 illustrates a method of wireless communication that supports configurations for small data transmission in accordance with the present disclosure.

FIG. 9 illustrates, as an example, a method 900 of wireless communication that supports configurations for small data transmission in accordance with the present disclosure. The method 900 may encompass various aspects of the techniques described with reference to FIGS. 2-5. The method 900 can be regarded as a base station counterpart to the UE-side method 600 as described with reference to FIG. 6. A base station (or one or more of its components) may implement the method 900 using hardware, firmware, or software, or a combination thereof.

At 910, a base station may transmit to a UE a configuration on user data transmission within a random access message by the UE in an RRC inactive state. The configuration may indicate whether the base station supports small data transmission, optionally with additional configuration parameters (e.g., on which methods or parameters of SDT are configured). The configuration can be transmitted to a UE via broadcast, unicast, or a combination of the two, and/or at various level of granularity, e.g., as generally described with reference to FIGS. 3-5. In particular, as described with reference to FIG. 5, the configuration may be specified on a per-DRB basis. For example, the per-DRB configuration may configure small data transmission for a particular data radio bearer.

At 920, the base station may receive user data from the UE based on the configuration. For example, as generally described with reference to FIG. 2, if the base station has enabled the small data transmission, the base station may, according to the configuration, receive user data within a random access message from a UE in RRC inactive state. In some cases, the user data may be received on some (but maybe not all) data radio bearers according to per-DRB configurations. Otherwise if the small date transmission is not enabled or supported, the base station may receive user data via means other than the random access message, such as over an uplink shared data logical channel for regular user traffic. The UE may transit from RRC inactive state to RRC active state in order to transmit the regular user traffic containing the user data.

Figure 10:
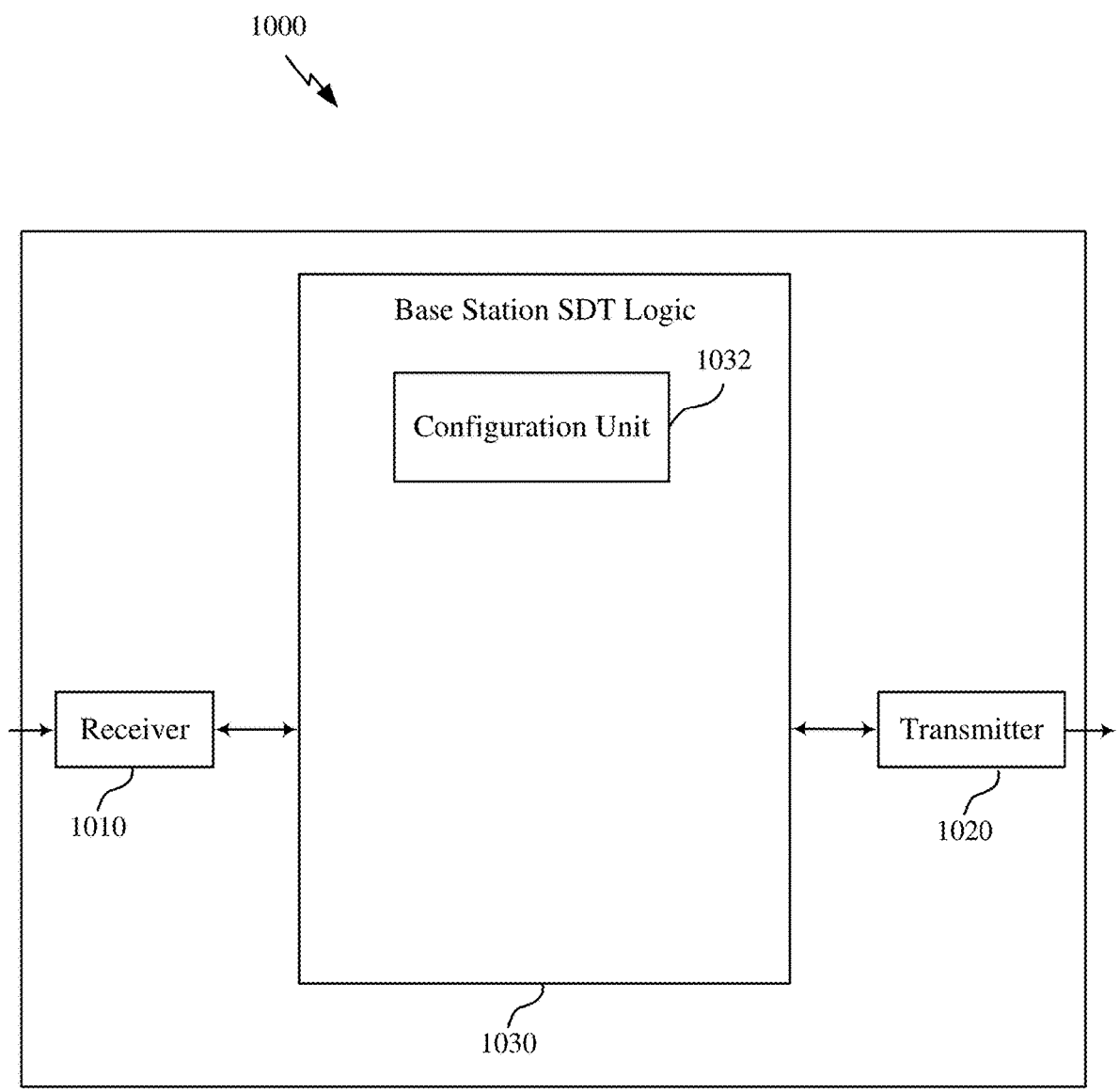
FIG. 10 illustrates an apparatus that supports configurations for small data transmission in accordance with the present disclosure.

FIG. 10 illustrates, as an example, an apparatus 1000 that supports configurations for small data transmission in accordance with the present disclosure. The apparatus 1000 may include a receiver 1010, a transmitter 1020, and a base station SDT logic 1030, and may perform various aspects of the method 900 described with reference to FIG. 9. The apparatus 1000 may be embodied by, or reside within, a base station 120 with reference to FIG. 1.

The receiver 1010 may be configured to receive signals or channels carrying information such as packets, user data, or control information associated with various information channels. Information may be passed on to other components of the apparatus. The receiver 1010 may utilize a single antenna or a set of multiple antennas.

The receiver 1010 may provide means for receiving user data from a UE based on a configuration on user data transmission (e.g., SDT) within a random access message by the UE in an RRC inactive state. For example, the receiver 1010 may receive random access preambles and/or data transmissions from a UE. In some implementations, the receiver 1010 may be configured to perform the method 900 at 920 described with reference to FIG. 9.

The transmitter 1020 may be configured to transmit signals or channels generated by other components of the apparatus. In some examples, the transmitter 1020 may be collocated with a receiver 1010 in a transceiver module. The transmitter 1020 may utilize a single antenna or a set of multiple antennas.

The transmitter 1020 may provide means for transmitting to a UE a configuration on user data transmission (e.g., SDT) within a random access message by the UE in an RRC inactive state. In some implementations, the transmitter 1020 may be configured to perform the method 900 at 910 described with reference to FIG. 9.

The receiver 1010 and transmitter 1020 (or a transceiver incorporating both) may be coupled to the base station SDT logic 1030 and may provide means for communication between the apparatus 1000 and one or more UEs.

The base station SDT logic 1030 may be a baseband modem or an application processor or may illustrate aspects of a baseband or application processor. The base station SDT logic 1030 or at least some of its various sub-components may be implemented in hardware, software executed by a processor, firmware, or any combination thereof. Software may comprise codes or instructions stored in a memory or like medium that is connected or in communication with the processor described above. The codes or instructions may cause the processor, the apparatus 1000, a base station 120, or one or more components thereof to perform various functions described herein.

The base station SDT logic 1030 may control, coordinate, or execute various functions supporting configurations for small data transmission. The base station SDT logic 1030 may further include a configuration unit 1032.

The configuration unit 1032 may manage and configure SDT related information (or parameters). For example, the configuration unit 1032 may generate an SDT-configuration field and include it in system information or an RRC release message. The configuration unit may support multiple means of SDT configurations, for example, broadcast and/or unicast configuration, and/or on per RNA, PLMN, and/or DRB basis, as generally described above.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include random access memory (RAM), read-only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication by a user equipment (UE), comprising:
   receiving from a base station a radio resource control (RRC) release message including a configuration for user plane data transmission within a random access message by the UE in an RRC inactive state, the configuration being specific to at least one data radio bearer (DRB) of the UE and including identity information for the at least one DRB;
   transitioning to the RRC inactive state suspending an RRC connection based on the RRC release message; and
   transmitting, using a DRB from the at least one DRB indicated in the configuration, user plane data to the base station based on the received configuration and while remaining in the RRC inactive state.

2. The method of claim 1, wherein the configuration includes the identity information for the at least one DRB of multiple DRBs for the UE, wherein the configuration selectively enables the user plane data transmission for the at least one DRB but not for a different DRB of the multiple DRBs for the UE.

3. The method of claim 1, further comprising:
   determining a resource for a random access preamble from one or more resources reserved for the user plane data transmission within the random access message; and
   transmitting the random access preamble to the base station on the determined resource, wherein the user plane data is to be transmitted within the random access message after the random access preamble by the UE in the RRC inactive state.

4. The method of claim 3, further comprising:
   selecting the random access preamble from one of multiple groups of one or more random access preambles, wherein each of the multiple groups is associated with a different maximum transport block size of the random access message.

5. The method of claim 1, wherein the user plane data is transmitted in the random access message to the base station while the UE remains in the RRC inactive state.

6. The method of claim 1, wherein the user plane data comprises a small data transmission (SDT) or an early data transmission (EDT) while the UE remains in the RRC inactive state.

7. The method of claim 1, wherein multiple DRBs are set up for the UE, wherein the UE is configured for the user plane data transmission within the random access message by the UE in the RRC inactive state for a first DRB of the multiple DRBs and not for a second DRB of the multiple DRBs.

8. A user equipment (UE), comprising:
   a receiver configured to receive from a base station a radio resource control (RRC) release message including a configuration for user plane data transmission within a random access message by the UE in an RRC inactive state, the configuration being specific to at least one data radio bearer (DRB) of the UE and including identity information for the at least one DRB, wherein the UE is configured to transition to the RRC inactive state that suspends an RRC connection based on the RRC release message; and
   a transmitter configured to transmit, using a DRB from the at least one DRB indicated in the configuration, user plane data to the base station based on the received configuration and while the UE remains in the RRC inactive state.

9. The UE of claim 8, wherein the configuration includes the identity information for the at least one DRB of multiple DRBs for the UE, wherein the configuration selectively enables the user plane data transmission for the at least one DRB but not for a different DRB of the multiple DRBs for the UE.

10. The UE of claim 8, wherein the transmitter is further configured to:
    determine a resource for a random access preamble from one or more resources reserved for the user plane data transmission within the random access message; and
    transmit the random access preamble to the base station on the determined resource, wherein the user plane data is to be transmitted within the random access message after the random access preamble by the UE in the RRC inactive state.

11. The UE of claim 10, wherein the transmitter is further configured to:
    select the random access preamble from one of multiple groups of one or more random access preambles, wherein each of the multiple groups is associated with a different maximum transport block size of the random access message.

12. The UE of claim 8, wherein the transmitter is configured to transmit the user plane data in the random access message to the base station while the UE remains in the RRC inactive state.

13. The UE of claim 8, wherein the user plane data comprises a small data transmission (SDT) or an early data transmission (EDT) while the UE remains in the RRC inactive state.

14. An apparatus of wireless communication, comprising:
means for receiving from a base station a radio resource control (RRC) release message including a configuration for user plane data transmission within a random access message by a user equipment (UE) in an RRC inactive state, the configuration being specific to at least one data radio bearer (DRB) of the UE and including identity information for the at least one DRB;
means for transitioning to the RRC inactive state suspending an RRC connection based on the RRC release message; and
means for transmitting, using a DRB from the at least one DRB indicated in the configuration, user plane data to the base station based on the received configuration and while remaining in the RRC inactive state.

15. The apparatus of claim 14, wherein the configuration includes the identity information for the at least one DRB of multiple DRBs for the UE, wherein the configuration selectively enables the user plane data transmission for the at least one DRB but not for a different DRB of the multiple DRBs for the UE.

16. The apparatus of claim 14, further comprising:
means for determining a resource for a random access preamble from one or more resources reserved for the user plane data transmission within the random access message; and
means for transmitting the random access preamble to the base station on the determined resource, wherein the user plane data is to be transmitted within the random access message after the random access preamble by the UE in the RRC inactive state.

17. The apparatus of claim 16, further comprising:
means for selecting the random access preamble from one of multiple groups of one or more random access preambles, wherein each of the multiple groups is associated with a different maximum transport block size of the random access message.

18. The apparatus of claim 14, wherein the means for transmitting are configured to transmit the user plane data in the random access message to the base station while the UE remains in the RRC inactive state.

19. A non-transitory computer-readable medium having instructions stored thereon, the instructions comprising codes executable for a user equipment (UE) to perform:
receiving from a base station a radio resource control (RRC) release message including a configuration for user plane data transmission within a random access message by the UE in an RRC inactive state, the configuration being specific to at least one data radio bearer (DRB) of the UE and including identity information for the at least one DRB;
transitioning to the RRC inactive state suspending an RRC connection based on the RRC release message; and
transmitting, using a DRB from the at least one DRB indicated in the configuration, user plane data to the base station based on the received configuration and while remaining in the RRC inactive state.

20. The non-transitory computer-readable medium of claim 19, wherein the configuration includes the identity information for the at least one DRB of multiple DRBs for the UE, wherein the configuration selectively enables the user plane data transmission for the at least one DRB but not for a different DRB of the multiple DRBs for the UE.

21. The non-transitory computer-readable medium of claim 19, wherein the codes are executable for the UE to perform the transmitting of the user plane data in the random access message to the base station while the UE remains in the RRC inactive state.

22. A method of wireless communication by a base station, comprising:
transmitting to a user equipment (UE) a radio resource control (RRC) release message including a configuration for user plane data transmission within a random access message by the UE in an RRC inactive state, the configuration being specific to at least one data radio bearer (DRB) of the UE and including identity information for the at least one DRB, wherein the RRC release message suspends an RRC connection with the UE; and
receiving, using a DRB from the at least one DRB indicated in the configuration, user plane data from the UE in the RRC inactive state based on the configuration.

23. The method of claim 22, wherein the configuration includes the identity information for the at least one DRB of multiple DRBs for the UE, wherein the configuration selectively enables the user plane data transmission for the at least one DRB but not for a different DRB of the multiple DRBs for the UE.

24. The method of claim 22, wherein the base station receives the user plane data from the UE in the random access message.

25. A base station, comprising:
a transmitter configured to transmit to a user equipment (UE) a radio resource control (RRC) release message including a configuration for user plane data transmission within a random access message by the UE in an RRC inactive state, the configuration being specific to a least one data radio bearer (DRB) of the UE and including DRB identity information for the at least one DRB, wherein the RRC release message suspends an RRC connection with the UE; and
a receiver configured to receive, using a DRB from the at least one DRB indicated in the configuration, user plane data from the UE in the RRC inactive state based on the configuration.

26. The base station of claim 25, wherein the configuration includes the identity information for the at least one DRB of multiple DRBs for the UE, wherein the configuration selectively enables the user plane data transmission for the at least one DRB but not for a different DRB of the multiple DRBs for the UE.

27. The base station of claim 25, wherein the receiver is configured to receive the user plane data from the UE in the random access message.

28. An apparatus of wireless communication, comprising:
means for transmitting to a user equipment (UE) a radio resource control (RRC) release message including a configuration for user plane data transmission within a random access message by the UE in an RRC inactive state, the configuration being specific to at least one data radio bearer (DRB) of the UE and including identity information for the at least one DRB, wherein the RRC release message suspends an RRC connection with the UE; and
means for receiving, using a DRB from the at least one DRB indicated in the configuration, user plane data from the UE in the RRC inactive state based on the configuration.

29. The apparatus of claim 28, wherein the means for receiving are configured to receive the user plane data from the UE in the random access message.

\* \* \* \* \*